Figure 1:
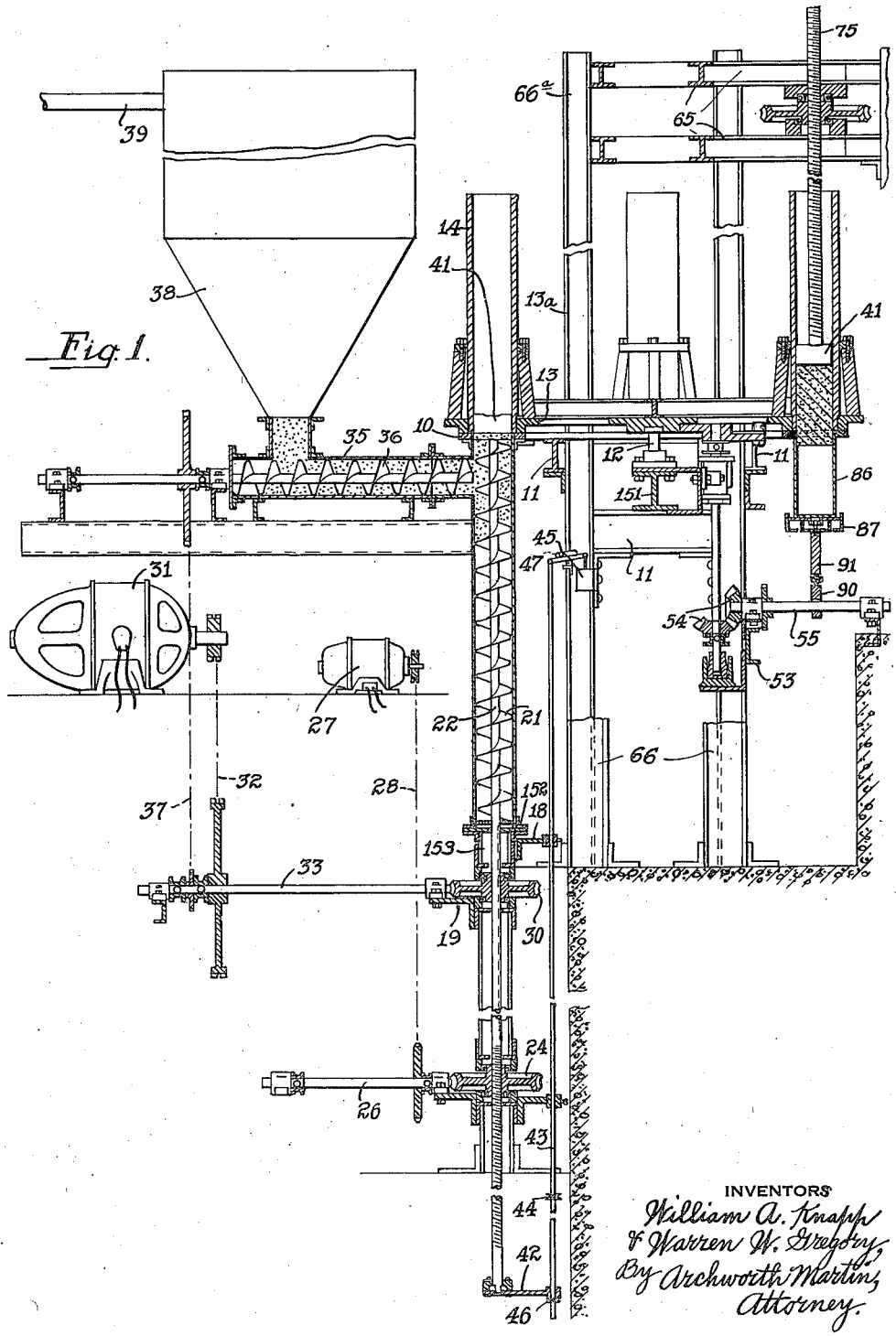

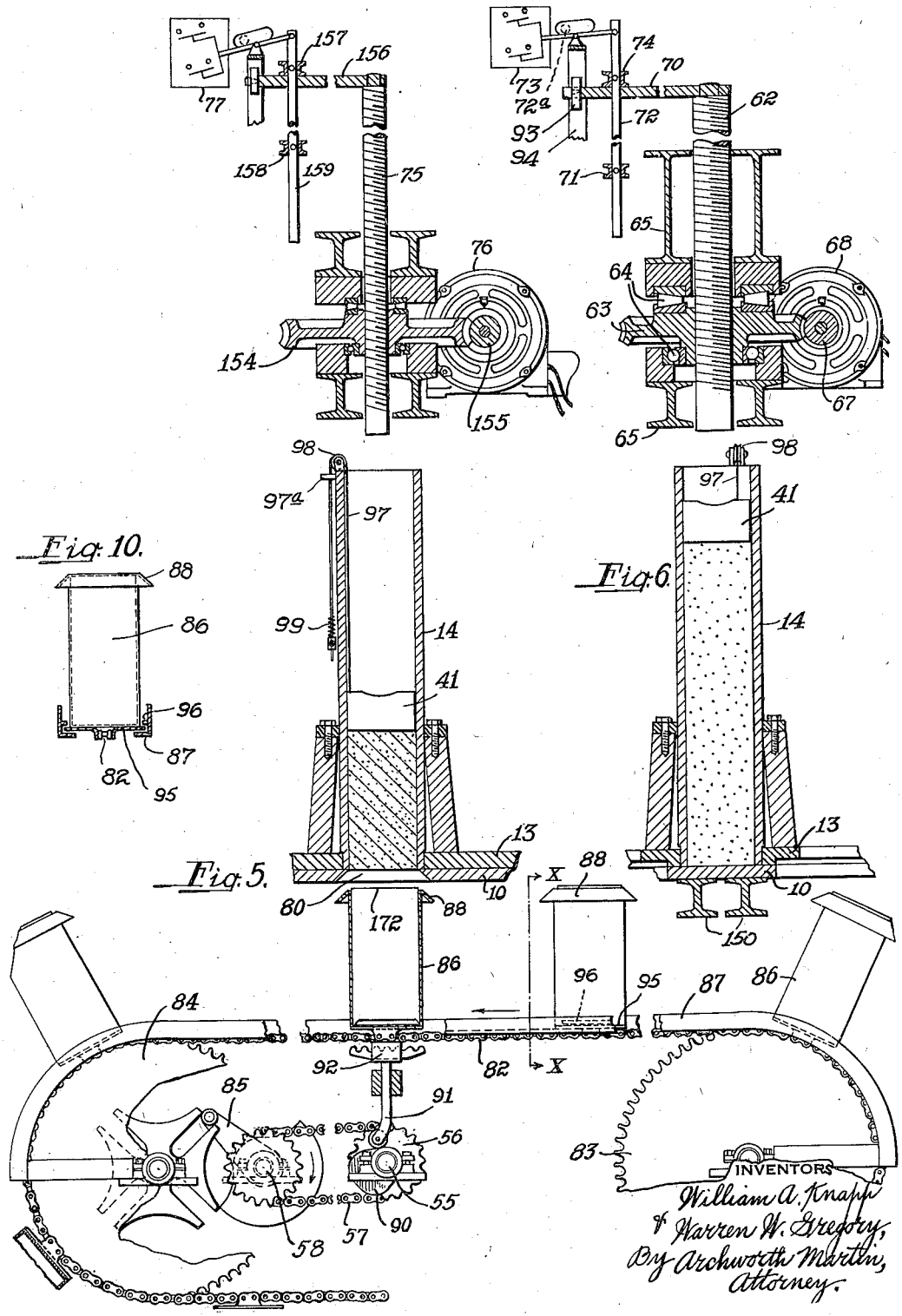

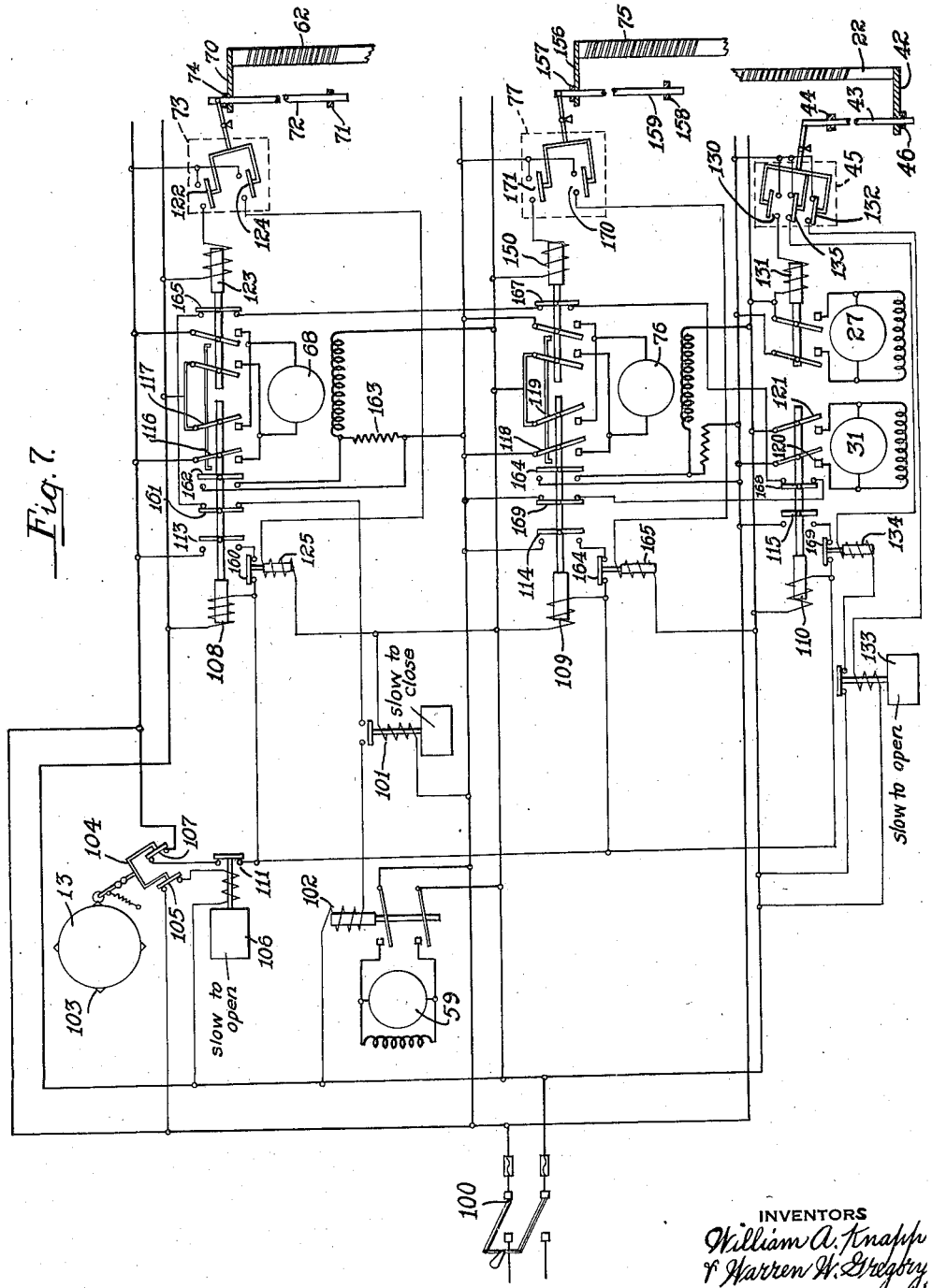

Patented June 21, 1938

2,121,635

UNITED STATES PATENT OFFICE 2,121,635

METHOD OF AND APPARATUS FOR FORMING CONDENSED CARBON BLACK

William A. Knapp and Warren W. Gregory, Monroe, La., assignors to Imperial Oil & Gas Products Company, Pittsburgh, Pa., a corporation of West Virginia Application February 26, 1936, Serial No. 65,852

8 Claims. (Cl. 226—101)

Our invention relates to a method of, and apparatus for, compacting and packaging pulverulent materials, and is hereinafter described as employed in connection with carbon black.

Carbon black in its natural condition is a very light and fluffy material. It occupies a large volume compared to its actual density. It is difficult to handle without the particles being blown about and contaminating other materials within the same building, without loss of material, and without damaging machinery, or inhalation by the workmen, contamination of the body, clothing or tools by particles blowing through the air. Heretofore, various attempts have been made to condense or compact carbon black so that it will not require so much space for a given weight of the material.

Our invention has for its object, the provision of an improved method and apparatus whereby the carbon black can be condensed and packaged for shipment in a simple and convenient manner either with or without employing various binders that have heretofore been used.

By our invention, we find it possible to compress the carbon black to a compact mass wherein one pound of the material will be contained within thirty cubic inches or less of space. Ordinarily, carbon black as removed from burner or hothouse buildings or from various types of collecting surfaces occupies a volume of from 300 to 900 cubic inches to each pound of carbon black.

From this condition, carbon black is treated by suitable mechanical contrivances to remove any foreign particles and to reduce it to a uniform pulverulent condition. These mechanical means may be—bolting, pulverizing, air-separating, or any other suitable means practiced in the art.

At this stage, carbon black occupies a minimum of approximately 500 cubic inches, or as much as a maximum of approximately 1500 cubic inches per pound, according to the quality being manufactured. From here, the carbon black is received in receiving, or agitating bins, where it is, by means of suitable contrivances, agitated or compacted and packed into paper bags. At this point, the volume per pound of the carbon black may range between 100 cubic inches and 400 cubic inches, according to the quality being packed.

Before describing in detail the operation of our invention, a summary of the sequences of operation is here outlined:

Pulverulent material, namely carbon black, is fed into a compression unit until the desired quantity or weight of material is within the compression unit.

This filled compression unit is then rotated or moved to a new position where the carbon black is compressed within the compression unit. The compression unit is again rotated or moved to another new position where the compressed carbon black is discharged from the compression unit into a suitable receptacle. This filled receptacle is then conveyed away to a predetermined and suitable receiving station. All of the operations above described are controlled and occur in their proper sequence without manual aid.

Figure 2:
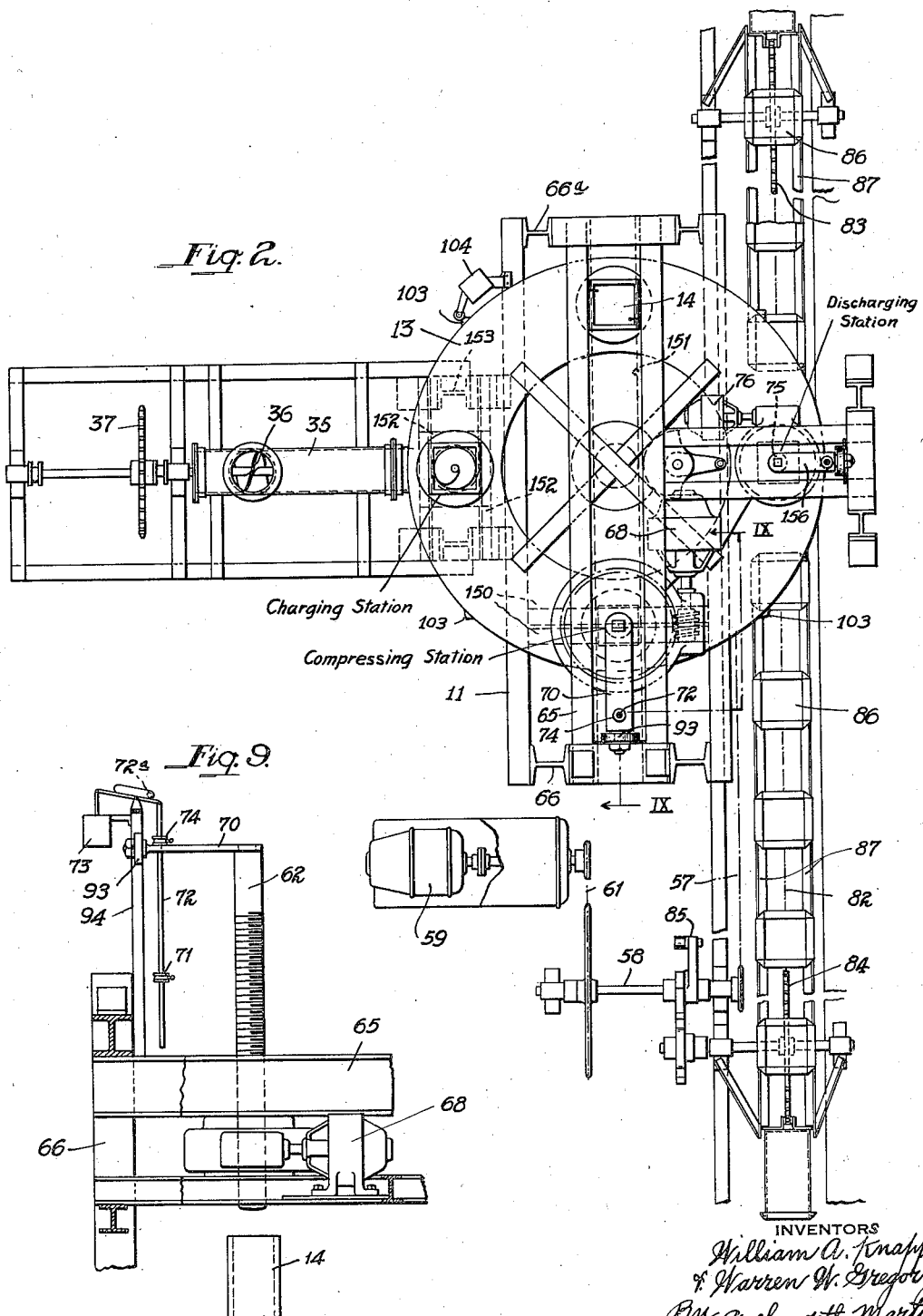
Figure 3:
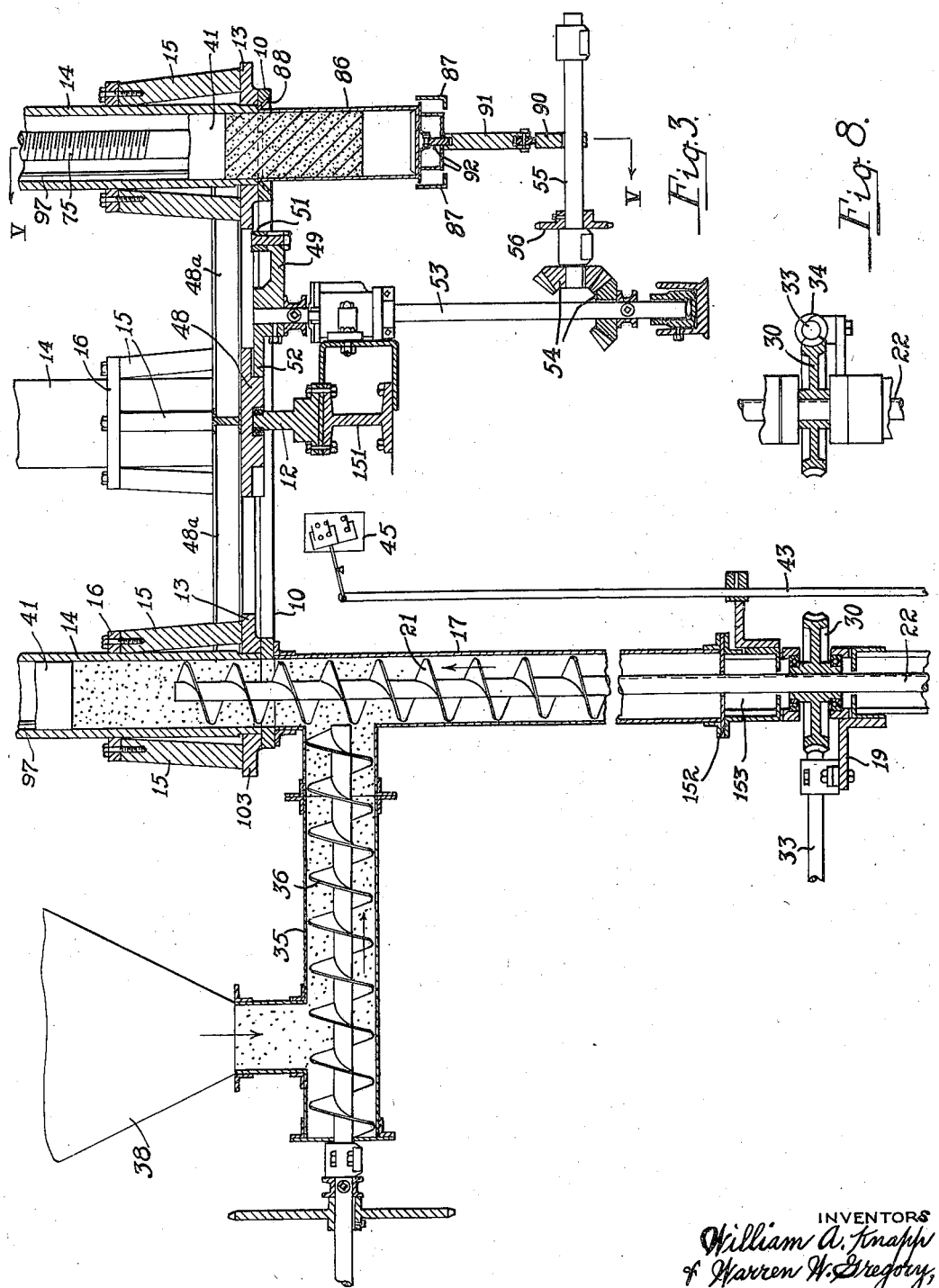
Figure 4:
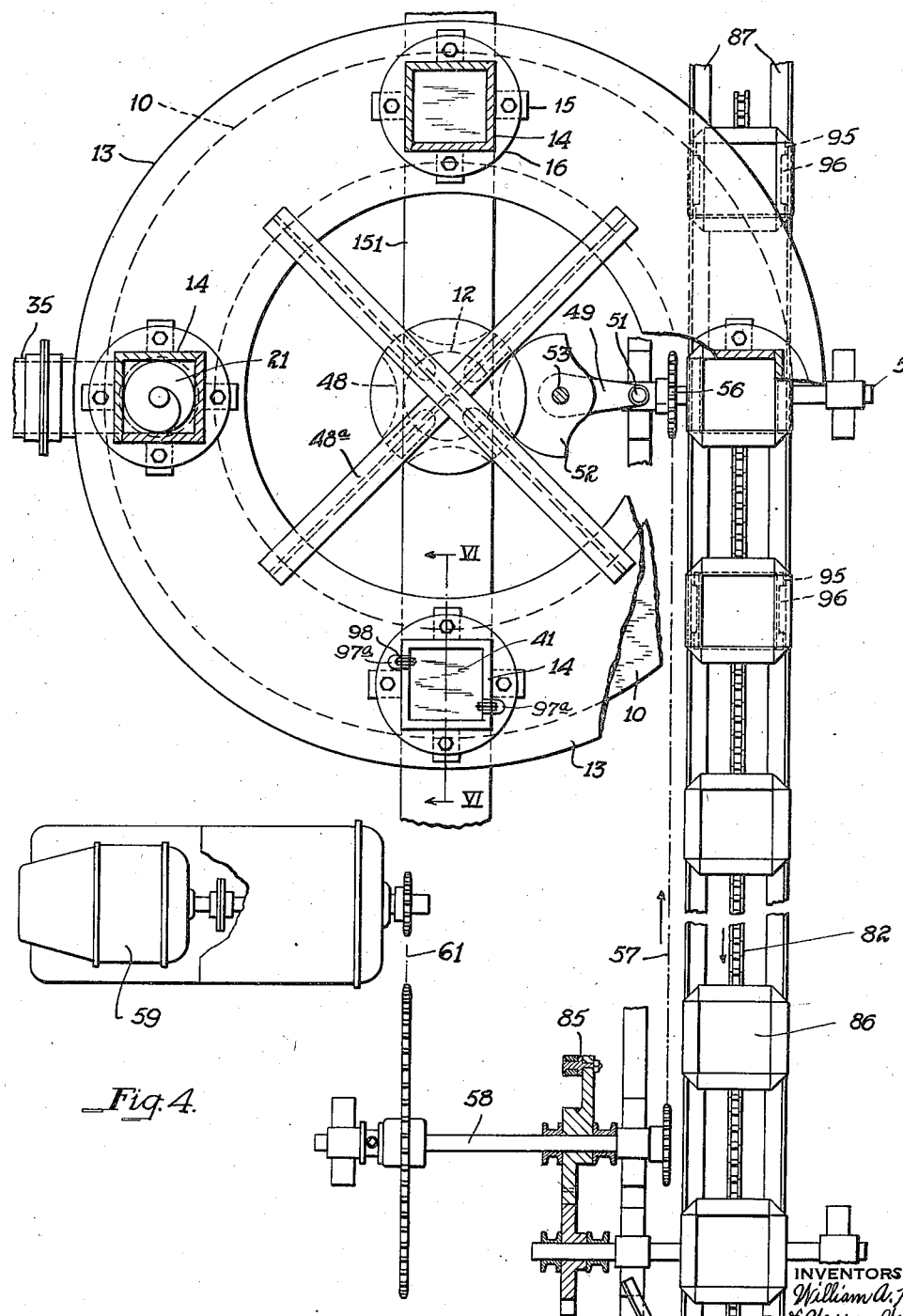

Apparatus for practicing our invention is shown in the accompanying drawings wherein Fig. 1 is a vertical sectional view; Fig. 2 is a top plan view; Fig. 3 is a vertical sectional view, showing a portion of the apparatus of Fig. 1, on an enlarged scale; Fig. 4 is a sectional plan view of the apparatus; Fig. 5 is a view taken on line V—V of Fig. 3; Fig. 6 is a view taken on line VI—VI of Fig. 4; Fig. 7 is a diagrammatic view showing the control circuit of the electrical apparatus; Fig. 8 is a detail view of a portion of the apparatus of Fig. 3; Fig. 9 is a view taken on the line IX—IX of Fig. 2; and Fig. 10 is a view taken on the line X—X of Fig. 5.

Referring more particularly to Figs. 1 to 4 inclusive, the apparatus includes a rotor foundation and seal plate 10, which is mounted on and supported by suitable framework 11. A pedestal bearing 12, Figs. 1 and 3, is mounted on and supported by a cross beam 151 of the structural framework 11.

The bearing 12 forms a pivot about which a rotor or table 13 is free to revolve within the limits permitted by the other parts of the apparatus later described. Compression units or boxes 14 are rigidly secured to the table 13, being held in position thereon by posts 15 which may be welded to the table top, and to which flange collars 16 of the units 14 are secured by means of bolts or screws. The lower ends of the boxes 14 extend through the table plate and are flush with the lower side thereof, as shown more clearly in Fig. 3. Within these boxes the carbon black is compressed as hereinafter described.

The compression units are spaced uniformly on the rotor top near the outer periphery. The rotor is moved step-by-step, as hereinafter described, to bring the compression units successively to the charging, compressing, and discharging stations, respectively (Fig. 2). The plate 10, on which the rotor 13 moves, is provided with openings at the charging and discharging stations through which the material is fed upwardly into the compression units 14 and discharged downwardly therefrom. These openings are of substantially the same cross-sectional contour and dimension as the interiors of the compression units.

At the charging station, a tubular conveyor conduit 17 is securely fastened at its upper end to the seal plate 10 and at its lower end securely fastened to a cross member 152, secured to uprights 153. A conveyor screw 21 is positioned within the tube 17, and provided with a shaft 22.

The lower portion of the shaft has a screw-threaded connection with a worm gear wheel 24 which is driven by a worm mounted on a shaft 26 that is driven from a motor 27, through a sprocket chain drive 28. The worm gear and worm are substantially the same as that shown in Fig. 8, and the worm prevents rotation of the worm gear 24 except when the motor is operating. Thus, the gear wheel 24 is held against rotation and, therefore, serves as a nut cooperating with the threaded shaft 22.

A worm gear wheel 30 has a spline or key connection with shaft 22 and is driven from a variable speed motor 31, through a sprocket chain drive 32, a shaft 33, and worm 34. When the motor 31 is driven, the conveyor screw 21 and its shaft 22 will be rotated, and as the shaft 22 rotates in the threaded gear wheel 24, the shaft will be elevated and lift the screw conveyor 21 bodily upward, while rotating, into the compression unit 14, the motor 27 being thereafter operated, as hereinafter described, to turn the threaded gear wheel 24 to gradually lower the screw conveyor out of the compression unit.

Carbon black is forcibly supplied to the vertical conveyor conduit 17, through a horizontal conveyor conduit 35 within which a screw conveyor 36 operates. The screw conveyor 36 is driven by a sprocket chain drive 37 from the shaft 33. It will be seen that the conveyor 21 and the conveyor 36 are rotated at the same time by the same motor, and that their relative speeds are so proportioned that the proper amount of carbon black is maintained in the vertical charging conduit 17 at all times.

If desired, the conveyor 36 can be driven by a separate variable speed motor.

The horizontal conveyor conduit 35 is supplied with carbon black from a hopper or a storage bin 38 into which the carbon black is fed or dumped on its way from the burner buildings. In order to be able to more firmly compact the carbon black, the material within the bin 38 can have a major portion of the air removed by stirring or other manner of agitation, or by a vacuum pipe 39, or by a combination of agitation and vacuum.

By supplying carbon black of known density from the bin 38, and by controlling the speed of the motor or motors which drive the conveyors 21 and 36, carbon black in quantity of approximately a desired weight can be fed into the tube 14 during a given period of time, or during one cycle of up and down travel of the conveyor 21. In this manner, charges or blocks of any desired uniform weight may be produced.

A piston 41 of any desired weight is slidable in each compression unit 14. At the beginning of each compression unit filling operation, the piston 41 is in its lower-most position. With the motor 27 idle, so that the worm wheel 24 is not rotated, carbon black is forcibly fed by the conveyor 36 through the conveyor pipe 35 into the vertical charging conveyor pipe 17 and is advanced upwardly into the compression unit 14 by the charging conveyor 21. During this charging operation of the conveyor 21, the shaft 22 is rotated in the gear wheel 24, and the conveyor 21 is gradually raised into the compression unit 14.

The forcing of the carbon black against the piston 41 and the lifting of the conveyor 21 upwardly, both tend to compress the carbon black against the piston 41 and to lift the movable piston 41 upwardly within the compression unit 14.

When piston 41 has been raised to some predetermined point, an arm 42 carried by the lower end of the shaft 22 and sliding upwardly on a control rod 43, engages an adjustable stop 44 on said rod, whereupon the rod 43 will be lifted to operate a mechanical toggle switch 45, which in turn, starts the motor 27 in operation. Now motor 27 turns threaded gear wheel 24 in such a direction and at such a speed that the charging conveyor 21 will gradually be lowered out of the compression unit 14 while it is still being actuated by motor 31 to force material into the compression unit 14 to fill the void caused by the recession of the conveyor 21. It will thus be seen that compacting of the carbon black within the compression unit 14 and the continued filling of the compression unit is effected both while the conveyor 21 is being raised into the compression unit, as shown in Fig. 3, and while it is being lowered out of the compression unit, the degree of compression of the material being determined entirely by the weight of the piston 41.

Filling the compression unit in this manner, we are able to compact the carbon black within the compression unit with great uniformity. If the conveyor 21 and shaft 22 were not shiftable longitudinally along its axis, as above described, compacting of the carbon black within the compression unit 14 would be greatest at the filling end, and, as the filling progressed, the compacting would continue to increase and would offer increasingly greater frictional resistance to filling of the compression unit.

It is further to be noted that by beginning filling operations, with the piston 41 in the lower-most position in the compression unit, the carbon black is accumulated in the compression unit in a more compact condition with less danger of air spaces or voids which would cause rupturing or spalling of the compressed carbon black block, than if the piston 41 were initially in any other position in the compression unit. This advantage is of course present even in those cases where the carbon black is neither agitated nor vacuumized or agitated and vacuumized before entering the compression unit. However, either the agitating or vacuumizing or agitating and vacuumizing operations, of course, further reduces the amount of air that might be entrapped in the condensed body of carbon black.

The carbon black is preferably conveyed from the burner buildings through an enclosed system of conduits, including the storage bin or hopper 38 and horizontal conveyor pipe 35 to the compression unit 14. Thus, there is no danger of contamination of the carbon black or absorption therein of moisture from the atmosphere. Also, it is advantageous to compress the carbon black while it retains as much of its original heat as possible, and while it contains the frictional heat resulting from the agitation, compression and conveying. Particles of carbon black adhere best under this condition.

Any hot air entrapped within the compressed carbon black block will contract upon cooling and thus have a tendency to cause adherence of the particles in the carbon black block, while, if cooler air is entrapped in the compressed carbon black block, it will expand at higher temperatures and cause rupturing or spalling of the block.

When the compression unit has been completely filled, and the filling conveyor 21 and shaft 22 has been withdrawn from the compression unit 14 to the position as shown in Fig. 1, the arm 42, sliding on the control rod 43 will engage the adjustable stop 46 causing a downward pull on the control rod 43 which will operate the mechanical toggle switch 45 which in turn will stop motor 31 and motor 27 as hereinafter described.

By adjusting the stop 44 longitudinally of the rod 43, the extent to which the screw 21 enters the chamber 14 on its upward movement can be varied, because such stop will be engaged at an earlier or a later period by the arm 42 to operate the switch 45, and start retracting movement of the conveyor. The extent to which the tube 14 is filled can thus be variably controlled without changing the feeding speeds of the conveyor.

The weight of the control rod 43, and other similar control rods hereinafter referred to, is counter-balanced by a shifting over-counterbalance 47 which holds the control rod 43 either in the up position or the down position, when moved by the arm 42.

The charging or filling operations just above described is effected each time that the rotor 13 is turned to bring an empty compression unit 14 into position above the charging conveyor tube 17.

The rotor 13 is given a step-by-step rotative movement to shift the compression units, with their charge of carbon black, from the position of one operation to that of another by means of a Geneva drive mechanism. A Geneva gear or slotted plate 48 is rigidly secured to the rotor 13 by means of the rail arms 48a. A Geneva drive member or arm 49 that carries a roller tooth 51, cooperates with the Geneva gear 48, by rotatively bringing the roller tooth 51 into engagement with the slots in the gear member 48. The member 49 is provided with an arcuate locking portion 52 which engages arcuate recesses in the gear plate 48 and prevents idle motion or rotation of the rotor 13. The element 49 is mounted on a shaft 53 that is driven through beveled gears 54 from shaft 55. The shaft 55 carries a sprocket wheel 56 which is driven by a chain 57 from a shaft 58 that is in turn driven by a motor 59 through a sprocket drive 61.

One step of movement by the Geneva gear drive just referred to will bring a filled or charged compression unit 14 to the compressing station where the partially compressed carbon black therein will be subjected to still greater pressure. The compressing mechanism is shown more clearly in Fig. 6, wherein the piston 41 is acted upon by a screw or ram 62 that has screw-threaded connection with a worm wheel 63 which is mounted between suitable bearings 64.

The bearings 64 are supported by cross beams 65 that are supported at their ends by upright columns 66 and 66a of the structural framework of the machine. The worm wheel 63 is driven by a worm 67 mounted on the shaft of a motor 68. The motor 68 is automatically set in operation, as hereinafter described, each time that a compression unit 14 is placed in position at the compression station. The motor 68, driving through worm 67 and worm wheel 63 causes the ram 62 to descend and force the piston 41 downwardly, thus, still further compressing the carbon black to any pressure desired.

Members 150 of the structural framework support the plate 10 against deflection under the compressive pressure. When the ram 62 has reached a predetermined point in its downward or compressing stroke, an arm secured to the upper end of the screw 62 will engage a collar or stop 71 which is adjustably mounted on a control rod 72 to operate a switch 73 which reverses the current through the motor 68 and causes the screw 62 to be raised at a predetermined rate of speed. During raising movement of the screw, the arm 70 will engage an adjustable stop 74 causing the control rod 72 to be lifted which in turn operates the switch 73 and stops the motor 68.

The rod 72 is counterbalanced by means of a shifting weight 72a to hold the rod in its actuated position. The stop collar 71 may be adjusted vertically on the rod 72 in order to variably control the degree of pressure exerted on the carbon black by the screw 62.

To prevent rotation of the screw 62, it is non-rotatably connected to the arm 70 which is provided with a roller 93 movable between vertical guide ways 94.

When the sequence of operations above referred to has been completed, the Geneva drive for the rotor 13 operates and the rotor will be moved still another step to bring the compression unit containing a fully compressed charge of carbon black to the discharging station. The mechanism at the discharging station is shown more clearly in Fig. 5, and is substantially the same as the mechanism at the compressing station. The discharging mechanism includes a threaded ejecting ram 75, a worm wheel 154, a worm 155, a motor 76, an arm 156, adjustable collars 157 and 158, a control rod 159, and a suitable switch 77. The discharging mechanism operates substantially in the same manner as does the compressing mechanism to force the piston 41 downwardly and eject the body of the compressed carbon black from the compression unit 14 through an opening 80 in the plate 10 into a waiting receptacle.

A conveyor is provided to convey and place cartons, or any other suitable receptacle, in position to receive the ejected blocks of carbon black and to carry the filled receptacles away at the proper time. The conveyor comprises a chain 82 passing around an idler sprocket 83 and a driven sprocket 84. The sprocket 84 is driven by a Geneva drive mechanism 85 which operates in the same manner as the Geneva drive for the table 13.

The driving member of the Geneva gearing 85 is driven by the shaft 58 so that the step-by-step movements of the conveyor will coincide, in their proper phase relationship, with the step-by-step rotational movements of the rotor 13. At suitably spaced points on the conveyor chain, metal shells 86 are placed, the shells being secured to bracket members 95 whose bottoms slide horizontally along angle guide rails 87.

The metal shells 86 are provided at their upper edges with inclined flanges 88 which, when the shell is lifted, will fit against the bevelled edge of the opening 80 in the plate 10. Cartons of paper, or any other suitable receptacles are placed within the metal shells 86. When a compression unit 14 is at the discharging position as shown in Fig. 5, the conveyor chain will be lifted to move the shell 86 and its contained carton into sealing engagement at the flanges 88 with the plate 10, so as to receive a compressed block of carbon black.

This raising movement of the chain and the shell 86 is effected by a cam 90 mounted on the shaft 55, acting against a push rod 91 which has a suitable head 92, that engages the chain and the underside of the shell and forces them upwardly. The guide rails 87 are provided with bars 96 that overlie the ends of the bracket members 95 (Figs. 5 and 10). The bars 96 are so spaced apart that the filled shell ahead of and the empty shell behind the shell at the discharge station engage the same and are prevented thereby from raising or tilting when the intermediate shell at the discharge station is lifted.

As soon as the compressed block of carbon black has been completely ejected from the compression unit 14 into the receiving receptacle 172, the motor 76 will automatically be reversed to withdraw the ejecting ram 75 and the cam 90 will lower the chain 82 and the metal shell 86, and the conveyor actuated to move the filled receptacle away from the discharging station. All this occurs in the proper phase relationship with the movements of the rotor 13.

Each block 41 is provided at diagonally opposite corners thereof with a flexible cable 97 that extends upwardly and over a pulley 98 secured to the top of the box 14 (Figs. 4 and 5). The free end of the cable adjustably carries a weight sufficient to maintain the cable taut and is provided with a spring 99 which cooperates with a bracket 97a mounted on the side of the box 14.

At the discharging station, with the block 41 moved downwardly to eject the block of carbon black, the spring is compressed somewhat through engagement with the bracket 97a. Upon retraction of the screw 75, the spring serves to raise the block 41 a distance sufficient to clear the upper edge of the plate 10. Thus, if the block 41 is moved downwardly past the upper edge of the plate 10, it is raised above such edge upon reversal of movement of the screw 75, so as to prevent damage to the apparatus when the table 13 is again moved.

It will be understood that the operations of filling, compressing, and discharging are independent operations, which start practically simultaneously and finish independently, at their respective stations.

Referring now to Fig. 7, with the various switches in their positions as shown, the operator will close the switch 100, thereby energizing the slow-to-close type timing relay 101. This relay operates and completes one point in the circuit of switch 102 which controls the circuit of the motor 59.

The table 13 carries cam buttons or knobs 103, equal in number to the number of boxes 14 on the table, that actuate a control switch 104. Through contacts 105 of switch 104 a circuit is completed for a slow-to-open type relay 106. Also, at contacts 107 a circuit is completed for the contactor switches 108, 109, and 110, respectively, through the closed contacts 111 of the switch 106.

The switches 108, 109, and 110 are thereby actuated, and through contacts 113, 114, and 115, respectively, complete locking circuits for the actuating coils of the respective switches. After the holding circuits have been completed, the relay 106 operates and opens the original energizing circuit for switches 108, 109, and 110 at contacts 111, and they cannot be reactuated until the table 13 has been indexed one step and the contactor 104 actuated thereby, thus preventing recycling.

At switch 108, through contacts 116 and 117, the circuit is completed for the compression motor 68, and the compressor screw 62 is thereby lowered as heretofore described. Also, contacts 162 of switch 108 close and shunt out field resistance 163 of the motor 68. At switch 109, through contacts 118, 119, and 164, the motor 76 is energized with a full field and the screw 75 lowered. At switch 110, through contacts 120—121, the circuit for the motor 31 is completed, and the conveyor screws 21 and 36 are actuated thereby, the screw 21 being lifted simultaneously as heretofore described.

At the compression station, when the ram 62 reaches a predetermined point in its downward travel, the arm 70 engages the adjustable set collar stop 71 which pulls the control rod 72 downwardly and operates the mechanical toggle switch 73 to close contacts 122 and 124. The circuit established through contacts 124 energizes relay 125 which operates to open a point in the holding circuit for contactor switch 108, and this switch returns to normal open position.

Opening of the contactor closes contacts 161 to establish a point in the circuit of the switch 102, and opens contacts 162, 116, and 117. Contacts 122 establish a circuit through the coil of contactor 123 which operates and reverses the motor 68 with a weakened shunt field due to the opening of contacts 162 of switch 108, and opens a point in the circuit of switch 102 at 165. The ram 62 is then moved upwardly until the arm 70 engages adjustable set collar 74 which lifts the control rod 72 and operates the switch 73, to open contacts 122 and 124, thereby de-energizing switches 123 and 125 to stop the motor 68, preparatory a new cycle of operation.

At the discharging station, when the screw 75 completes its lowering movement, the switch 77 is operated to cause reversal of the motor 76 by energizing contactor 150 and to cause de-energization of the switch 109, the screw thereby elevating and at its upward limit of movement opening the switch 77 and thereby stopping the motor.

As to the control of the feed screw 21, when the screw and its shaft 22 reaches its upward limit of movement, the switch 45 is actuated, and at contacts 130 completes a circuit for the switch 131, which energizes the motor 27. The motor 27 thereby causes the gear 24 to lower the screw 21 as heretofore described. At contacts 132, the circuit of the slow-to-open relay 133 is opened. By the de-energization of this relay, a point in the circuit of the relay 134 is completed, but this relay does not energize owing to the fact that a point in its circuit is opened at contacts 135 of the switch 45. When the screw shaft 22 reaches its lowermost position, the switch 45 is reactuated in the opposite direction, resulting in opening the circuit for the motor 27 at contacts 130, completing the circuit for the relay 133 at contacts 132, and also completing a circuit for the relay 134 at the contact 135.

Since the relay 133 does not open for a short interval of time, the relay 134 is energized and opens the locking circuit for the switch 110, and this switch returns to normal position. Upon expiration of the time interval required to actuate the relay 133, the circuit for the relay 134 is opened, and it restores to normal position.

When each of the motors 68, 76, 31, and 27 have completed their respective cycles and are at rest, a series circuit is completed through contacts 161, 165, 167, 168, and 169 of contactors 108, 123, 150, 110, and 109 respectively, and through the closed contacts of relay 101, and through the coil of the switch 102. The switch 102 closes and starts the motor 59 which rotates the rotor 13, and advances the conveyor one step. As soon as the rotor 13 moves from the position as shown in Fig. 7, the mechanical toggle switch 104 will pass off the cam 103 holding it closed and the contacts 105 and 107 will open, thus de-energizing relay 106 to close contacts 111. The motor 59 continues to operate and turn the rotor 13 until switch 104 engages the succeeding cam which closes the switch 104. The switch 102 de-energizes when any point in its series energizing circuit is opened by operation of a contactor switch, and the motor 59 stops.

If the various switches, motors, and screws fail to operate properly for any reason, the switch 102 will not be energized to start the motor 59. Thus, by each advancing movement of the table 13, the switch 104 is actuated, to initiate a new cycle of operations.

The timing of the relay 106 is greater than the timing of the relay 133, so that the original energizing circuit for the switch 110 is maintained thereby until the relay 133 opens. Upon operation of the relay 133, the relay 134 de-energizes, and establishes the holding circuit for the relay 110. Thereafter, upon actuation of the switch 45 to start the motor 27, as heretofore described, the relay 134 is not energized to open this holding circuit, because one point of the circuit is opened at contacts 135 of switch 45. The release of switch 110 by actuation of the relays 133 and 134 has been heretofore described.

Timing relay 101 is a selective relay, which operates only once every time the switch 100 is closed, and whose only purpose is to delay closing the circuit for the contactor 102 until after any one of the contactors 108, 109, 110, 123, and 150 have had an opportunity to operate first, thereby assuring a proper continuance or sequence of operation of the various motors when starting.

We claim as our invention:—

1. Apparatus for compacting pulverulent material, comprising a box open at its lower side, a wall-like abutment element within the box and movable upwardly therein under the pressure of material against one side thereof, a conveyor conduit positioned to discharge upwardly into said box, a screw conveyor in the said conduit, means for operating the conveyor for moving the material through said conduit, means for moving the conveyor into said box in an axial direction, means for withdrawing the conveyor from the box while operating the same to feed material into the box, and means for removing the material from the box.

2. Apparatus for compacting pulverulent material, comprising a chamber having an opening in one end thereof, a wall-like abutment within the chamber and movable toward the other end thereof, under a predetermined pressure of material, a feeding element movable into the open end of the chamber, means for withdrawing the said element during feeding of material thereby into the chamber, and means for removing the material from the chamber.

3. Apparatus for compacting pulverulent material, comprising a vertically disposed cylindrical chamber open at its lower end, a wall-like abutment within the chamber and movable toward the other end thereof under a predetermined pressure of material, a tubular conveyor conduit positioned opposite to the open end of the said chamber, of similar diameter and in axial alignment therewith, a screw conveyor in said conduit, means for moving the conveyor into and out of the said chamber, and means for removing the material from the chamber.

4. Apparatus for compacting pulverulent material comprising a chamber open at its lower end and a conduit having a feed screw therein which is movable upwardly into the chamber, means for rotating the feed screw, to feed material to the chamber, means for simultaneously moving the feed screw into the chamber, means for positively withdrawing the feed screw from said chamber during continued rotation of the screw and at a predetermined rate, and means for removing the material from the chamber.

5. Apparatus for charging and compacting pulverulent material comprising a chamber open at its lower end, a vertical conveyor conduit having a discharge outlet at its upper end, means operating in said conduit for forcing a stream of material therethrough and discharging the same through said outlet, means for moving said chamber into position to receive the discharged material through said lower end of the chamber, a weighted abutment slidable within said chamber from end-to-end thereof, and movable upwardly under the pressure of the material forced into the chamber therebeneath, and means for removing the material from the chamber.

6. The method of obtaining measured charges of pulverulent material such as carbon black, which comprises conveying the material in a loose condition upwardly in a stream, accumulating it in a chamber beneath a movable abutment therein, which recedes upwardly as the material accumulates, simultaneously subjecting the material in the chamber to the unrestricted weight of the abutment to compact it to a density sufficient only to sustain the weight of the abutment, separating the material in the chamber from the stream after the abutment has been raised to a predetermined position in the chamber, and removing the compacted material from the chamber.

7. The method of obtaining measured charges of pulverulent material such as carbon black, which comprises conveying the material upwardly in a stream by feeding pressure applied to the material along the axis of the stream, discharging the material through an unrestricted passageway into a chamber and against a movable abutment therein which recedes as the material accumulates therebeneath, subjecting the material in the chamber to the unrestricted weight of the abutment, to compact the material to a density sufficient only to sustain the weight of the abutment, separating the material in the chamber from said stream when the abutment reaches a predetermined position in the chamber, and removing the compacted material from the chamber.

8. The method of forming compacted blocks of pulverulent material such as carbon black, which comprises feeding the material upwardly into a chamber and against a movable abutment therein, subjecting the material to the unrestricted weight of the abutment to compact the material to a density sufficient to sustain the weight of the abutment, feeding the material into the chamber until the abutment is moved upwardly to a predetermined position in the chamber, thereby forming a charge of substantially predetermined density and quantity, thereafter subjecting the charge of material in the chamber to an additional compressive force independently of the feeding operation, to reduce the charge to a compacted block of predetermined volume, and then discharging the compacted block into a container.

WILLIAM A. KNAPP.
WARREN W. GREGORY.